W. B. RICE & J. C. HOULT.
Harvester and Thrasher.
No. 198,522. Patented Dec. 25, 1877.
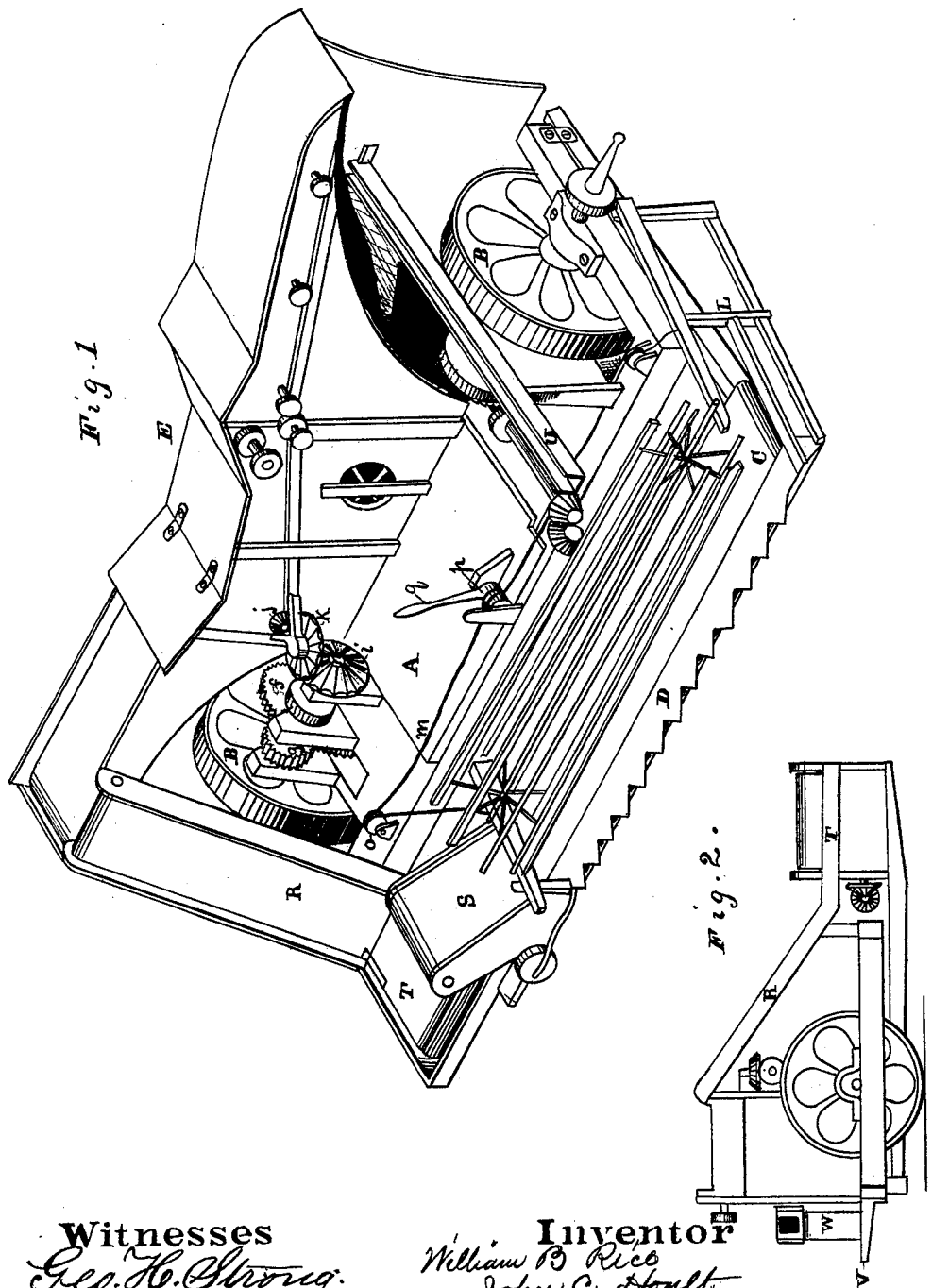

UNITED STATES PATENT OFFICE.

WILLIAM B. RICE, OF MODESTO, AND JOHN C. HOULT, OF STOCKTON, CAL.

IMPROVEMENT IN HARVESTER AND THRASHER.

Specification forming part of Letters Patent No. 198,522, dated December 25, 1877; application filed July 9, 1877.

*To all whom it may concern:*

Be it known that we, WILLIAM B. RICE, of Modesto, county of Stanislaus, and JOHN C. HOULT, of Stockton, county of San Joaquin, and State of California, have invented an Improved Harvesting-Machine; and we do hereby declare the following to be a full, clear, and exact description thereof, reference being had to the accompanying drawings.

Our invention relates to an improved arrangement for combining a header and thrasher in one machine, so as to complete the harvesting of grain by a single combined operation.

Our invention consists in mounting a thrashing-machine directly upon the ordinary header-frame in the rear of the draper, and driving it by suitable gearing from one of the bearing-wheels of the header-frame.

It also consists in the combination and arrangement of parts, all as hereinafter more fully described.

Referring to the accompanying drawings, Figure 1 is a perspective view, and Fig. 2 an end view.

Let A represents an ordinary header-frame, only, for our purpose, we construct it somewhat stronger than the ordinary frame is made. B B are the bearing-wheels. C is the usual header-draper, and D is the sickle.

Upon the header-frame A we place and secure a thrashing-machine, E, which may be of any desired style and construction. This thrashing-machine we place across the frame just behind the center of the bearing-wheels, so that its cylinder end is toward the side of the header-frame on which the grain is usually carried and discharged.

The power for driving the thrashing-machine we obtain by proper connections with one of the bearing-wheels of the header-frame, while the sickle and main draper is driven from the other bearing-wheel. The particular manner of transmitting the power from the bearing-wheel of the header-frame to the cylinder-shaft of the thrashing-machine is immaterial. But we have represented a spur-wheel, *f*, on the shaft of the driving-wheel, which engages with a toothed wheel, *g*, on the end of a horizontal shaft, *h*. This shaft is mounted in standards upon the header-frame, and its opposite end has a bevel-wheel, *i*, secured upon it. Motion is transmitted from this bevel-wheel to a bevel-wheel, *j*, on the projecting end of the cylinder-shaft by an intermediate bevel-wheel, K, as represented. Motion is transmitted from the opposite bearing-wheel, through a system of gears and shafts, to the sickle and reel in the ordinary way. The hinged frame L, which carries the sickle, main draper, and reel, we arrange to be raised and lowered by means of two cords, *m m*. The end of one of the cords is attached to the frame L on one side of the machine, and it passes up over a pulley, O, on the frame A, thence to a drum, *p*, which is mounted at the middle of the frame A, directly in front of the thrasher. The other cord is arranged in the same manner on the opposite side of the machine, only it is attached to the drum *p*, so as to wind in an opposite direction, so that the rotation of the drum winds or unwinds both cords simultaneously.

The drum *p* is operated by means of a lever, *q*, by a person who stands upon the platform in front of the thrasher, so that he has a full view of the field in advance of the machine, and can raise and lower the sickle as required.

The endless feed belt or carrier R projects out from the feed end of the machine, and extends beyond the side of the machine.

The main draper C is carried up over a short permanent inclined section, S, at the delivery end, instead of the usual hinged inclined section.

T is another draper, which receives the grain from the elevated end of the draper C, and elevates it to and delivers it upon the feed-carrier R. This draper is secured to the feed-carrier frame and main frame of the machine at the proper inclination, and has a short horizontal portion at its lower end, upon which the grain is received from the delivery end of the draper C. We thus establish and maintain a continual and automatic stream of grain from the sickles to the thrasher by means of the system of drapers, so that the feed of the machine is as regular as the work of the sickles.

U is a grain-spout, which projects from the tail of the thrasher out over the main draper C, and which serves to catch and convey any grain or unthrashed heads which may attempt to pass through the thrasher back upon the draper, so that it will be again conveyed by the drapers into the machine and rethrashed. The straw drops from the tail of the machine upon the ground as the machine passes along.

This machine is propelled by horses in the usual manner of operating headers.

A platform, V, is constructed on the rear side of the thrasher, where the sacking of the grain, which is raised by the elevator W, is accomplished, and as fast as the sacks are filled they are dropped upon the ground alongside of the machine, from whence they can be subsequently picked up.

Having thus described our invention, what we claim and desire to secure by Letters Patent, is—

1. The combination of a thrashing-machine, F, with a header-frame, A, when the thrashing-machine stands across the header-frame parallel with the header-sickle, in combination with the drapers and carriers C T R, for conducting the grain in a continuous automatic stream from the sickle to the thrashing-machine, substantially as described.

2. The drum $p$, with its lever $q$, located on the platform in front of the thrasher, in combination with the oppositely-wound ropes $m\ m$, the opposite ends of which are attached to the hinged frame L, substantially as and for the purpose described.

In witness whereof we have set our hands and seals.

WILLIAM B. RICE. [L. S.]
JOHN C. HOULT. [L. S.]

Witnesses to William B. Rice:
 JAS. H. MADDOX,
 DANIEL WHITMORE.
Witnesses to Jno. C. Hoult:
 JNO H. WEBSTER,
 A. HERVEL.